UNITED STATES PATENT OFFICE.

FRIEDRICH RASCHIG, OF LUDWIGSHAFEN-ON-THE-RHINE, GERMANY.

PRODUCTION OF HYDRAZIN.

No. 910,858.    Specification of Letters Patent.    Patented Jan. 26, 1909.

Application filed October 31, 1907. Serial No. 400,002.

*To all whom it may concern:*

Be it known that I, FRIEDRICH RASCHIG, doctor of philosophy and chemist, subject of the King of Bavaria, residing at Ludwigshafen-on-the-Rhine, Germany, have invented new and useful Improvements in the Production of Hydrazin, of which the following is a specification.

My invention relates to the production of hydrazin by reacting on monochloramin ($NH_2Cl$) with ammonia.

It has generally been assumed that upon the addition of hypochlorites to ammonia or ammonium salts, ammonium hypochlorite $NH_4.O.Cl$ is formed. It has only once been suggested that during this reaction a product, monochloramin $NH_2Cl$, containing one molecule less water, is formed (*Proc. Chem. Soc.* 1890, p. 24). It can easily be proved that this suggestion is correct, for a solution of sodium hypochlorite to which ammonia has been added no longer shows the general reaction of hypochlorites of imparting a violet coloration to anilin-water. It therefore no longer contains hypochlorous acid and actually by distillation *in vacuo* a compound of the composition $NH_2Cl$ can be isolated in the form of a very volatile oil which is easily soluble in water and possesses a disagreeable odor of chlorid of nitrogen.

I have now discovered that monochloramin can by treatment with ammonia be made to form hydrazin according to the equation

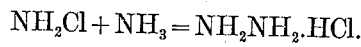
$$NH_2Cl + NH_3 = NH_2NH_2.HCl.$$

In order to prepare hydrazin with advantage according to this reaction, it is unnecessary and, indeed, inadvisable to isolate the extremely decomposable and poisonous monochloramin and subsequently treat it with ammonia, but I prefer to treat a hypochlorite directly with an excess of ammonia. The formation of monochloramin takes place practically at once and subsequently two reactions tend to take place of which the first is represented by the equation given above and leads to the formation of hydrazin, while the second reaction leads to the formation of ammonium chlorid and the liberation of free nitrogen according to the equation

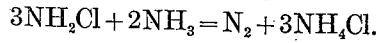
$$3NH_2Cl + 2NH_3 = N_2 + 3NH_4Cl.$$

I have discovered that the second and undesirable reaction tends to preponderate if the mixture of the monochloramin with excess of ammonia be allowed to stand in the cold, or if a catalyser such for instance as small quantities of iron and copper, or a compound such as acetone which lowers the viscosity of the solution be present. On the other hand, if the mixture containing the monochloramin and ammonia is heated without delay, preferably to the boiling point, or if, either when hot, or when cold, a compound which increases the viscosity of the solution such for instance as glycerin, sugar, starch, casein, albumen, gum, and glue, is present, the first reaction resulting in the production of hydrazin is favored and yields up to from 70 to 80% of the theoretical amount of hydrazin can be obtained. The addition of formaldehyde solution also influences favorably the production of hydrazin, in all probability because of the formation of carbohydrates by the reaction on the formaldehyde of alkali formed during the production of the monochloramin. In all cases an excess of ammonia tends to increase the yield of hydrazin.

The following examples will serve to illustrate further the nature of my invention and the method of carrying it into practical effect, but my invention is not confined to these examples.

Example 1. Add one (1) liter of sodium hypochlorite solution containing about seventy (70) grams of active chlorin to one (1) liter of twenty (20) per cent. ammonia solution, the temperature being preferably kept below fifteen (15) degrees centigrade. The formation of the monochloramin takes place very rapidly and the mixture obtained contains no trace of hypochlorite, but only chloramin and an excess of ammonia. The mixture should without delay be heated to the boiling point, whereupon a reaction according to the equation

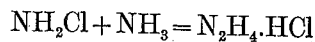
$$NH_2Cl + NH_3 = N_2H_4.HCl$$

takes place side by side with the formation of nitrogen. Hydrazin is formed and can easily be isolated in the form of the very difficultly soluble sulfate by boiling away the excess of ammonia, acidifying with sulfuric acid, and evaporating till crystallization commences. From twenty-five (25), to thirty (30), grams of hydrazin sulfate, that is, from twenty (20), to twenty-five (25), per cent. of the theoretical yield, are obtained.

Example 2. Stir together three hundred (300) grams of bleaching powder with one (1) liter of twenty (20) per cent. ammonia solution and then rapidly heat the mixture to the boiling point, whereupon considerable quantities of hydrazin are formed. In this case also it can be isolated in the form of hydrazin sulfate by boiling off the excess of ammonia, acidifying with sulfuric acid, filtering off the calcium sulfate formed and evaporating till crystallization commences.

Example 3. Add twelve (12) cubic centimeters of a five (5) per cent. glue solution to three (3) liters of twenty (20) per cent. ammonia solution, then add further one (1) liter of sodium hypochlorite solution containing about seventy (70) grams of active chlorin, and then heat up the mixture finally driving off the excess of ammonia. The residue contains hydrazin which can be conveniently isolated by evaporating the residue and precipitating the hydrazin in the form of its sulfate.

Now what I claim is:

1. The process of producing hydrazin by reacting on monochloramin with ammonia.

2. The process of producing hydrazin by heating monochloramin with an excess of ammonia.

3. The process of producing hydrazin by reacting on monochloramin with ammonia in the presence of a compound which increases the viscosity of the solution.

4. The process of producing hydrazin by reacting on monochloramin with ammonia in the presence of glue.

5. The process of producing hydrazin by heating monochloramin with an excess of ammonia in the presence of glue.

In testimony whereof I have hereunto set my hand in the presence of two subscribing witnesses.

FRIEDRICH RASCHIG.

Witnesses:
ERNEST F. EHRHARDT,
JOS. H. LEUTE.